Sept. 28, 1937.  H. N. LYONS  2,094,546
MANUFACTURE OF ALKYL SULPHATES
Filed June 12, 1936
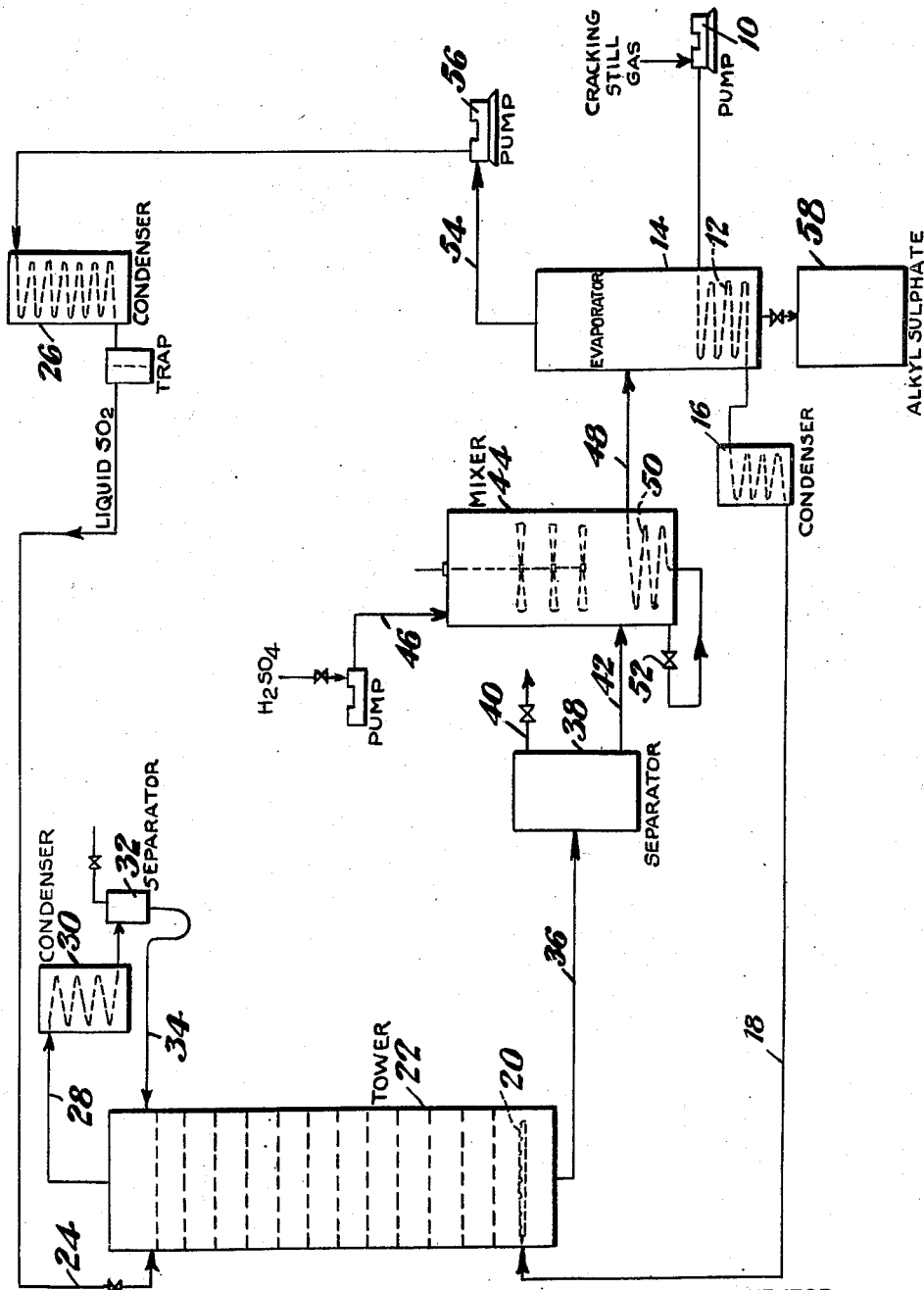
INVENTOR
HENRY N. LYONS
BY
ATTORNEY Patented Sept. 28, 1937

2,094,546

UNITED STATES PATENT OFFICE 2,094,546

MANUFACTURE OF ALKYL SULPHATES

Henry N. Lyons, Maplewood, N. J., assignor to Power Patents Company, Jersey City, N. J., a corporation of Maine Application June 12, 1936, Serial No. 84,814

3 Claims. (Cl. 260—156)

This invention relates to the manufacture of alkyl sulphates, and more particularly concerns an improved method of producing alkyl sulphates from the gaseous olefinic constituents of petroleum refinery cracking still gases.

The primary object of the invention is to provide an improved and highly efficient method for producing alkyl sulphates from the gaseous olefine components of petroleum refinery cracking still gases. With this object in view a feature of the invention resides in the employment of liquid to liquid contact between the olefinic constituents of the cracking still gas and the sulphuric acid for the purpose of securing more intimate contact and more thorough and uniform reaction between the gaseous olefines and the acid than is obtainable when the acid is contacted with the olefines in the gaseous phase. Another feature of the invention resides in the use of liquid sulphur dioxide as a solvent for holding the gaseous olefins in solution during the reaction with the acid. Among the advantages of the method of treatment are more accurate control of reaction temperature, more efficient utilization of the reacting chemicals, and reduction in polymerization and waste reaction products.

With the above and other objects and features in view, the invention consists in the improved process of producing alkyl sulphates which is hereinafter described and more particularly defined in the accompanying claims.

In the accompanying drawing a diagrammatic flow diagram is shown of the apparatus elements requisite for carrying out the basic steps of the process.

Gaseous olefinic hydrocarbons suitable for use in the process are most easily obtained as refinery tail gases produced by cracking petroleum hydrocarbons. According to the improved process of the present invention a cracking still gas containing both olefinic and paraffinic hydrocarbon components is first contacted at suitable temperature and pressure with liquid sulphur dioxide for the purpose of effecting selective absorption of the gaseous olefinic hydrocarbons in the sulphur dioxide. The sulphur dioxide solution of absorbed olefinic hydrocarbons is thereafter agitated with sulphuric acid of suitable strength and under suitable sulphating conditions to effectively combine with the gaseous olefins to produce alkyl sulphates while such olefins are still in solution in the liquid sulphur dioxide. Separation of the liquid sulphur dioxide from the alkyl sulphates can then be effected by distilling off the sulphur dioxide, and the resulting alkyl sulphate then may be hydrolyzed to alcohols or converted to esters or otherwise reacted as desired.

Referring to the drawing, the residual gas from a petroleum cracking plant may be introduced to a compressor 10 where it is compressed to a pressure of 100 to 200 pounds per square inch. The compressed gas is then conducted through a heat exchange coil 12 which is located in the lower portion of an evaporator 14 and in which the gas is cooled. From the coil 12 the gas is passed through a dryer 16 where water and any condensable hydrocarbons are separated. After leaving condenser 16 the gas flows through line 18 to an apertured coil 20 from which it enters the lower portion of an absorber unit 22. Absorber 22 may be a bubble cap column designed to effect intimate contact between the cracking still gas introduced through coil 20 and liquid $SO_2$ absorbing medium introduced at the top of the tower. The liquid $SO_2$ which is used to absorb the gaseous olefins enters the upper portion of absorber 22 from a valved inlet pipe 24 after having been cooled and liquefied in a condenser 26.

In passing upwardly through the absorber 22 the gas is brought into intimate contact with a downwardly flowing stream of liquid $SO_2$ on each tray of the absorber. The absorber is preferably operated under a pressure of 100 to 200 lbs. per square inch and at a temperature of 50 to 80° F., at which temperature and pressure the propylenes, butylenes, and amylenes are selectively absorbed from the mixture of gases by the sulphur dioxide. The saturated hydrocarbon tail gas and any $SO_2$ vapor which is removed from the top of column 22 through vapor line 28 is passed through a condenser 30 into a separator 32, where any condensable liquid is collected and returned by return line 34 to the top of the column 22.

The liquid $SO_2$ solution of gaseous olefins accumulating in the base of absorber 22 is conducted by drawoff line 36 into a separator 38 wherein any undissolved hydrocarbons entrained therewith are allowed to separate by gravity and withdrawn through valved pipe 40. From separator 38 the $SO_2$ solution of olefins is conducted by pipe 42 into a mixer 44 which is illustrated as an agitator type mixer adapted for operation under pressure. In mixer 44 intimate contact is effected between the $SO_2$ solution of gaseous olefines and sulphuric acid of 75%–93% strength, introduced from a source of acid supply through valved line 46. The temperature which is maintained in mixer 44, and the strength and concentration of sulphuric acid which is admitted thereto, is so regulated with respect to the amount of gaseous olefines introduced through line 42 as to insure sulphation of the olefines to produce a maximum yield of monoalkyl sulphates, while avoiding polymerization and formation of undesirable tarry residues and di- or tri-alkyl sulphates. The mixer is preferably operated at a temperature of 30–50° F. and under a pressure of 100–200 pounds per square inch. The products of the sulphation reaction are removed at a controlled rate from the base of the mixer through a valved draw off line 48 including a coil 50 located in the lower portion of mixer 44. Coil 50 serves as a cooling coil in which the liquid is reduced to atmospheric pressure after passing valve 52.

The thus withdrawn mixture of liquid $SO_2$ and alkyl sulphates is conducted into evaporator 14 in which a temperature of 20–25° F. is sufficient to effect separation of the $SO_2$ from the alkyl sulphates by evaporation at the atmospheric pressure obtaining therein. $SO_2$ vapors leave the top of the evaporator through a vapor line 54 and are compressed in compressor 56 and conducted to the condenser 26 for liquefaction. Liquid $SO_2$ is then recycled by line 24 back to the top of absorber 22.

The alkyl sulphates withdrawn from the base of evaporator 14 into storage tank 58 may be treated with water or aqueous alkali to hydrolize the sulphates to the corresponding alcohols, or the alkyl sulphates may be purified and used as a source of alkyl sulphates for other chemical syntheses.

While the treatment with sulphuric acid has been illustrated as all being carried out in one reactor or mixer 44, it is often advantageous and desirable to effect the acid reaction in a plurality of stages by employing acid of progressively increasing strength, and recovering the reaction products from each stage of treatment between successive treatments. By such multistage acid treatment, as for example described in the patent of Born and Isham No. 1,744,207, dated January 21, 1930, it is possible to selectively recover alkyl sulphates of the more reactive olefines such as those yielding tertiary alcohols on hydrolysis, by first subjecting the olefines to the action of a mild acid which will react with the more unstable olefines, and separating the alkyl sulphates thus formed before contacting the $SO_2$ solution of residual less reactive olefines with stronger acid having a greater tendency to polymerize the more unstable compounds. In any case careful control of temperature and pressure must be maintained in the acid contacting units, and the temperatures normally should not be allowed to substantially exceed 50° F. when sulphating gaseous olefines in the range from propylene to amylene at the pressures indicated.

Having thus described the invention, what is claimed as new is:

1. In the treatment of petroleum cracking still gases containing gaseous olefines for the production of alkyl sulphates, the method which comprises absorbing the gaseous olefines in liquid sulphuric dioxide and thereafter subjecting the absorbed olefines to contact with 75% to 93% sulphuric acid at a temperature in the range 30° to 50° F. and under 100 to 200 lbs. pressure while holding such olefines in solution in said liquid sulphur dioxide.

2. In the treatment of petroleum cracking still gases containing gaseous olefines for the production of alkyl sulphates, the method which comprises absorbing the gaseous olefines in liquid sulphur dioxide under a pressure of 100 to 200 pounds per square inch, thereafter contacting the absorbed olefines with 75% to .93% sulphuric acid at a temperature in the range 30° to 50° F. and under 100 to 200 lbs. pressure while in solution in said liquid sulphur dioxide, and thereafter separating the alkyl sulphates formed from the $SO_2$ by evaporation of the $SO_2$.

3. In the treatment of cracking still gases containing olefinic hydrocarbons for the production of alcohol, the improvement comprising intimately contacting the cracking still gases with liquid sulphur dioxide to selectively absorb the olefins, thereafter subjecting the absorbed olefins to contact with 75% to 93% sulphuric acid under 100 to 200 lbs. pressure at a temperature in the range 30° to 50° F. while in solution in said sulphur dioxide, separating the acid alkyl sulphates formed from the sulphur dioxide, and hydrolyzing the acid alkyl sulphates.

HENRY N. LYONS.